UNITED STATES PATENT OFFICE.

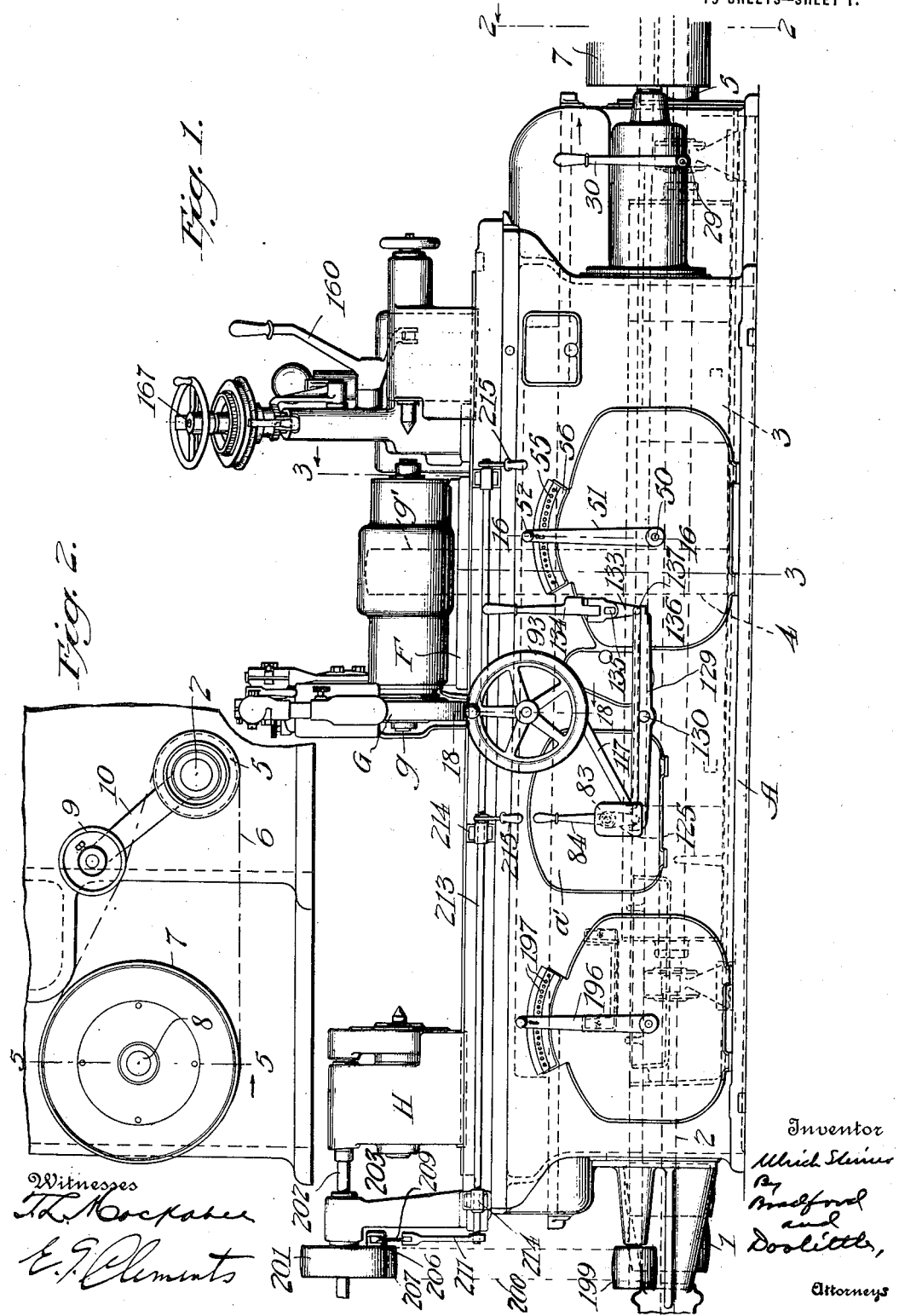

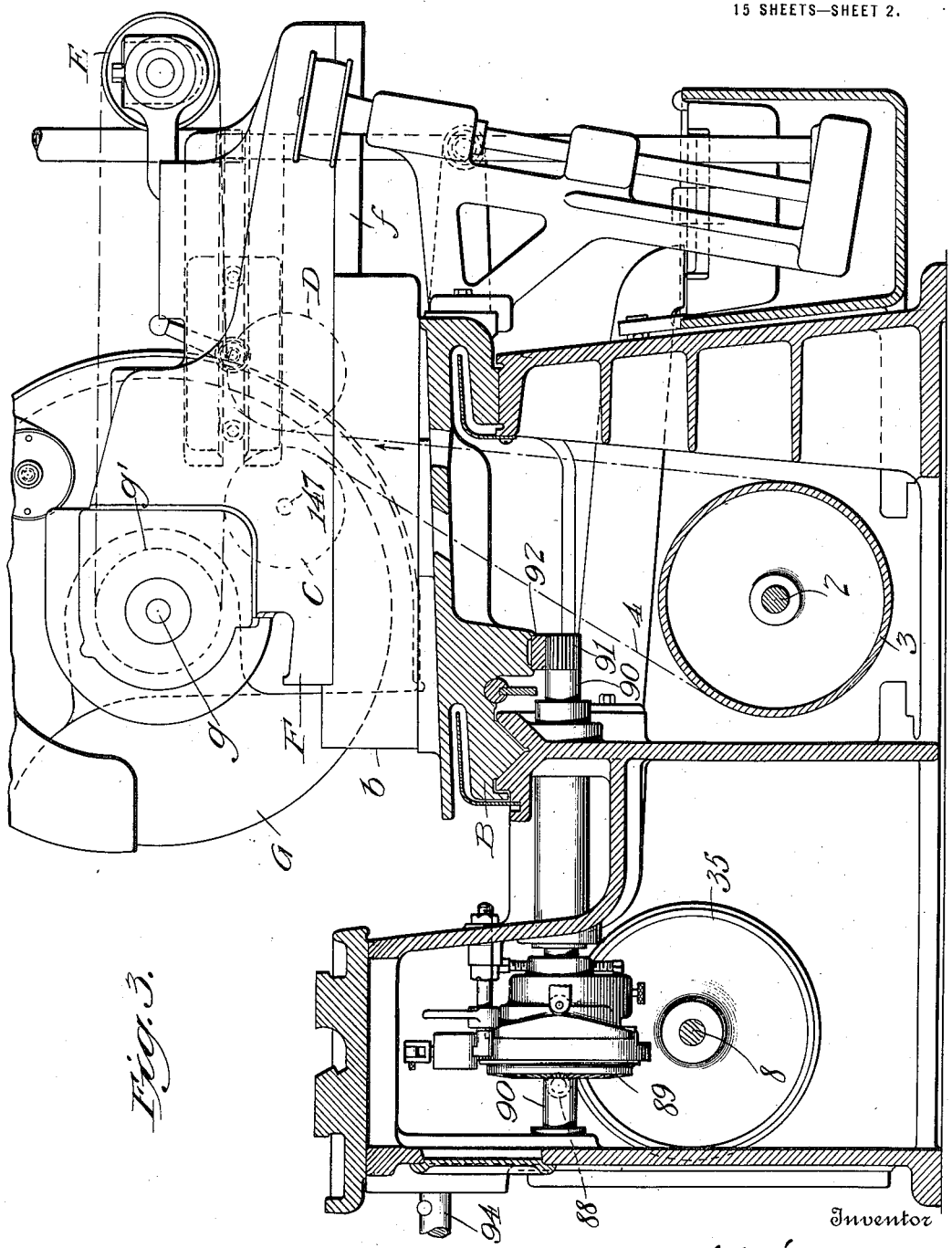

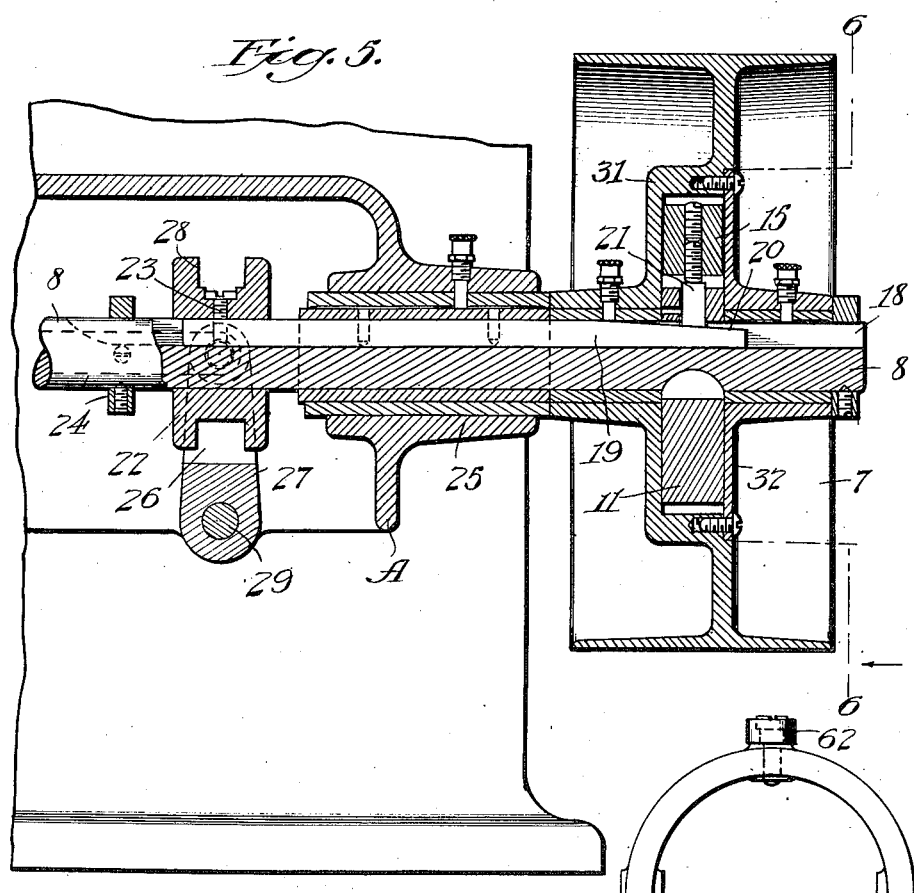
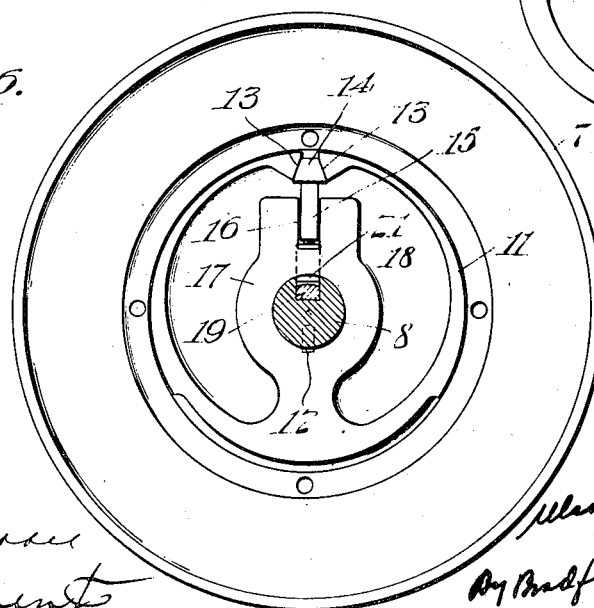

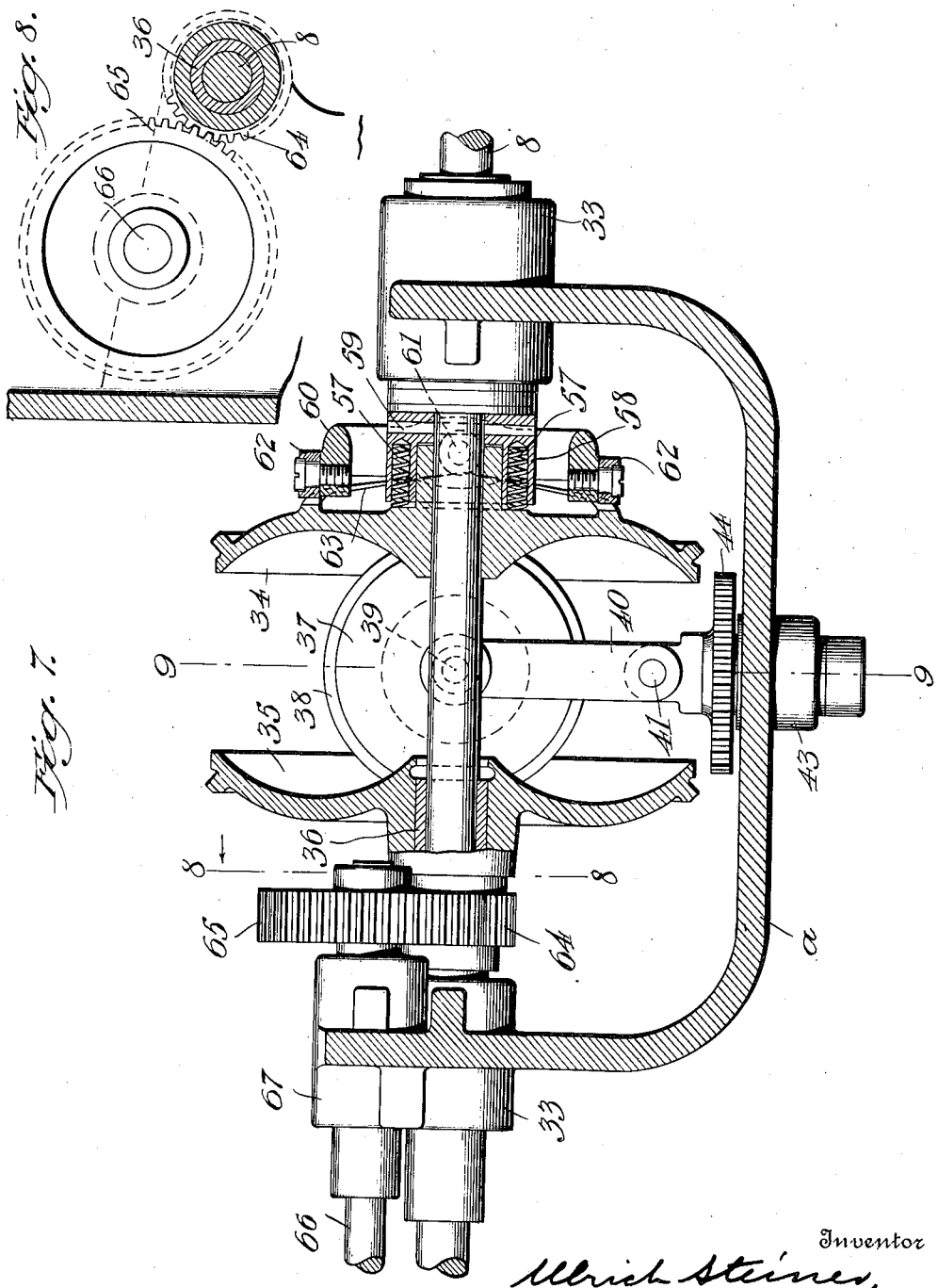

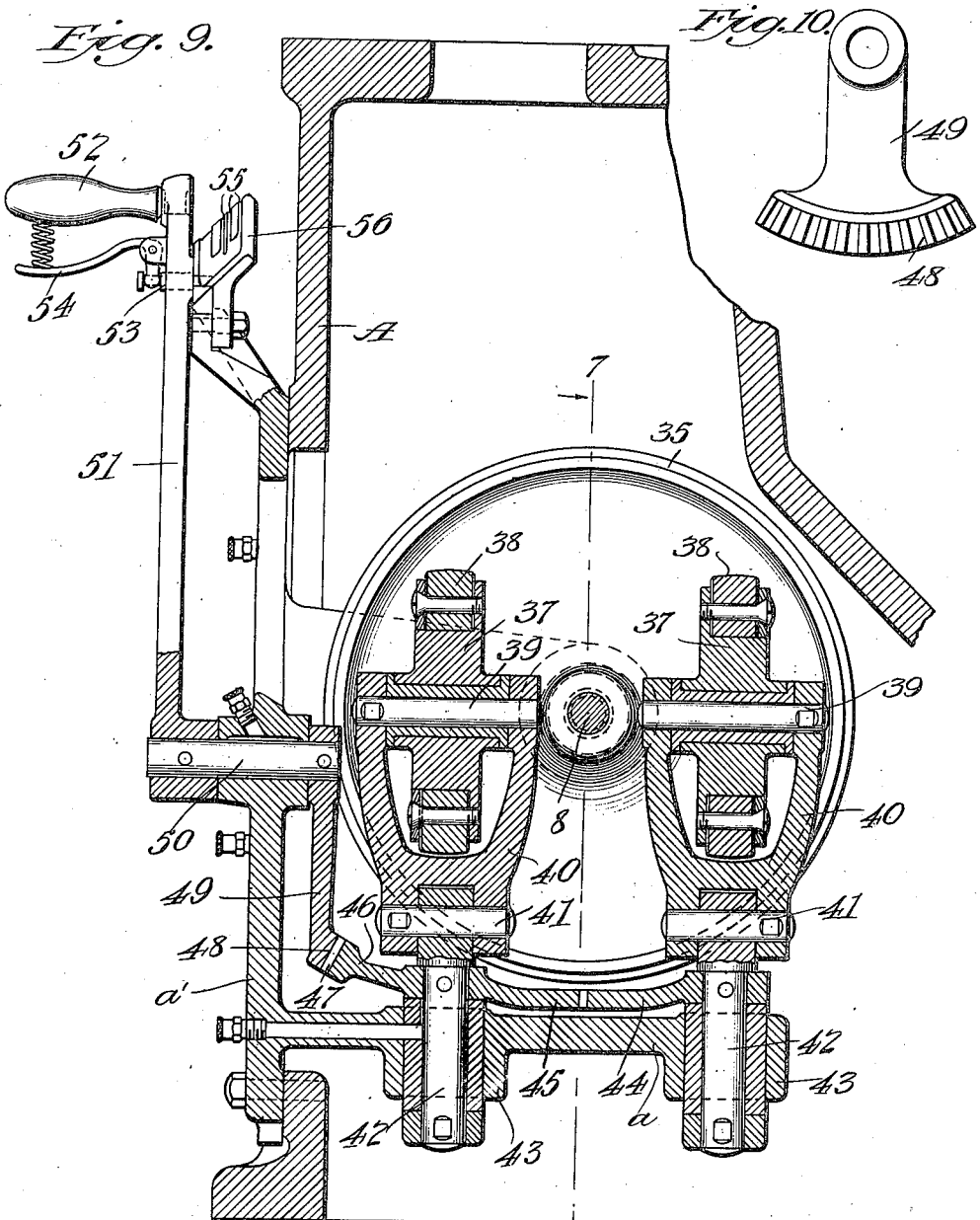

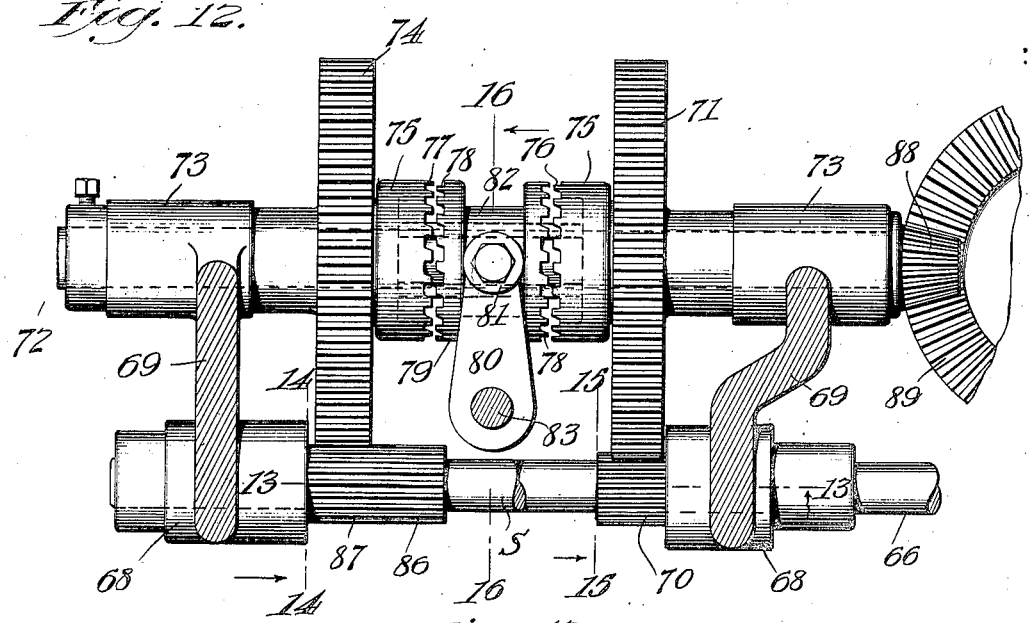
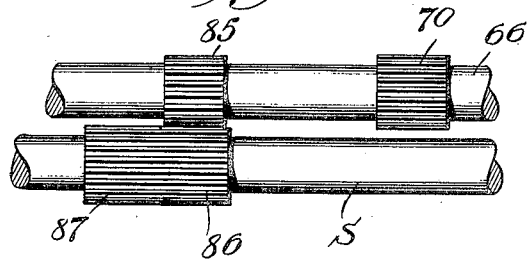
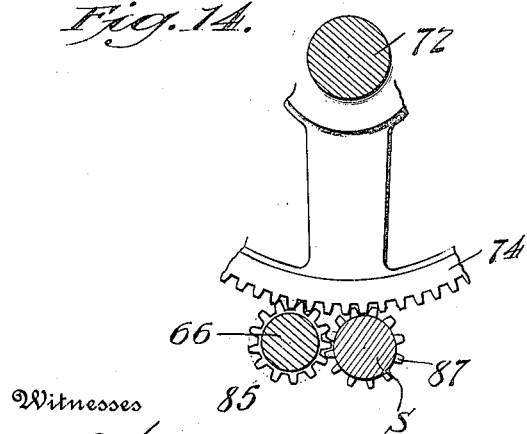
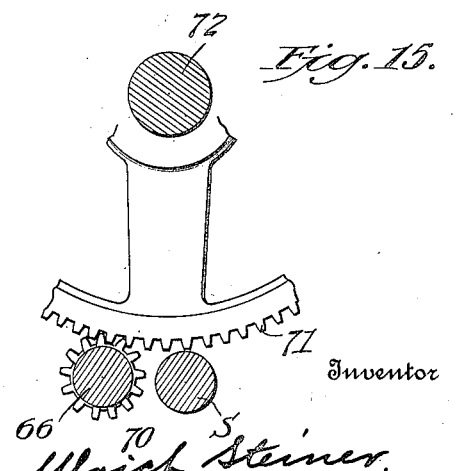

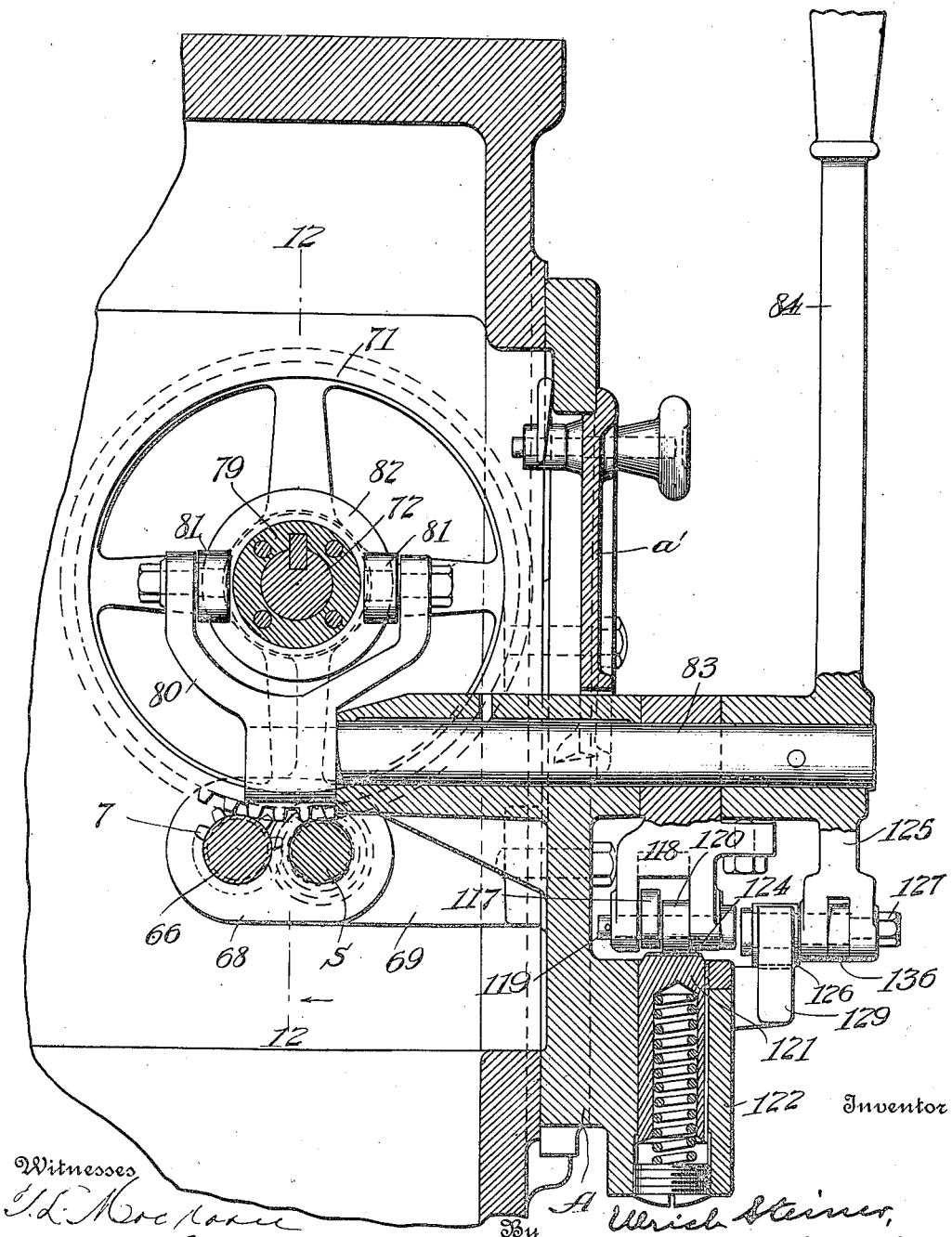

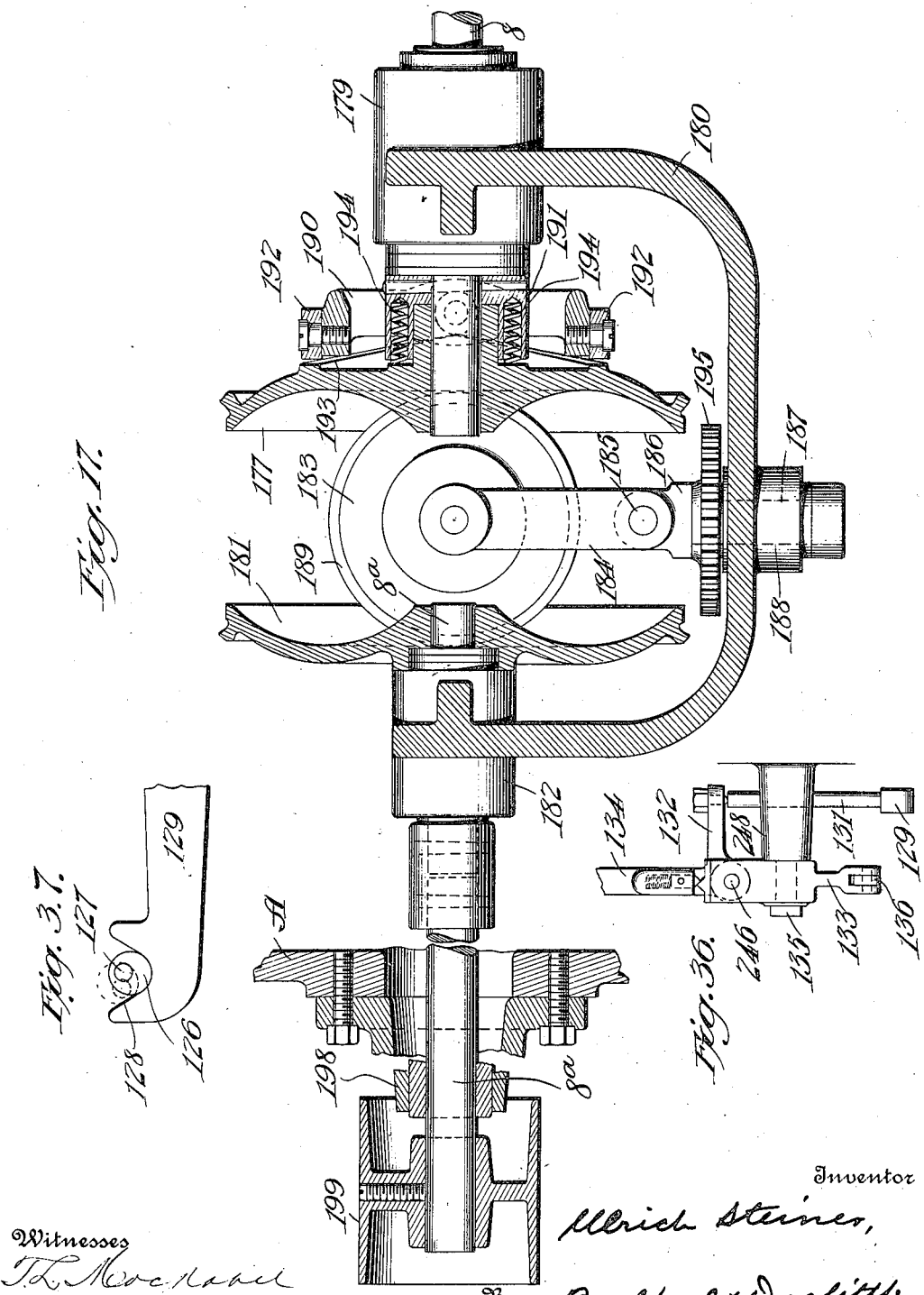

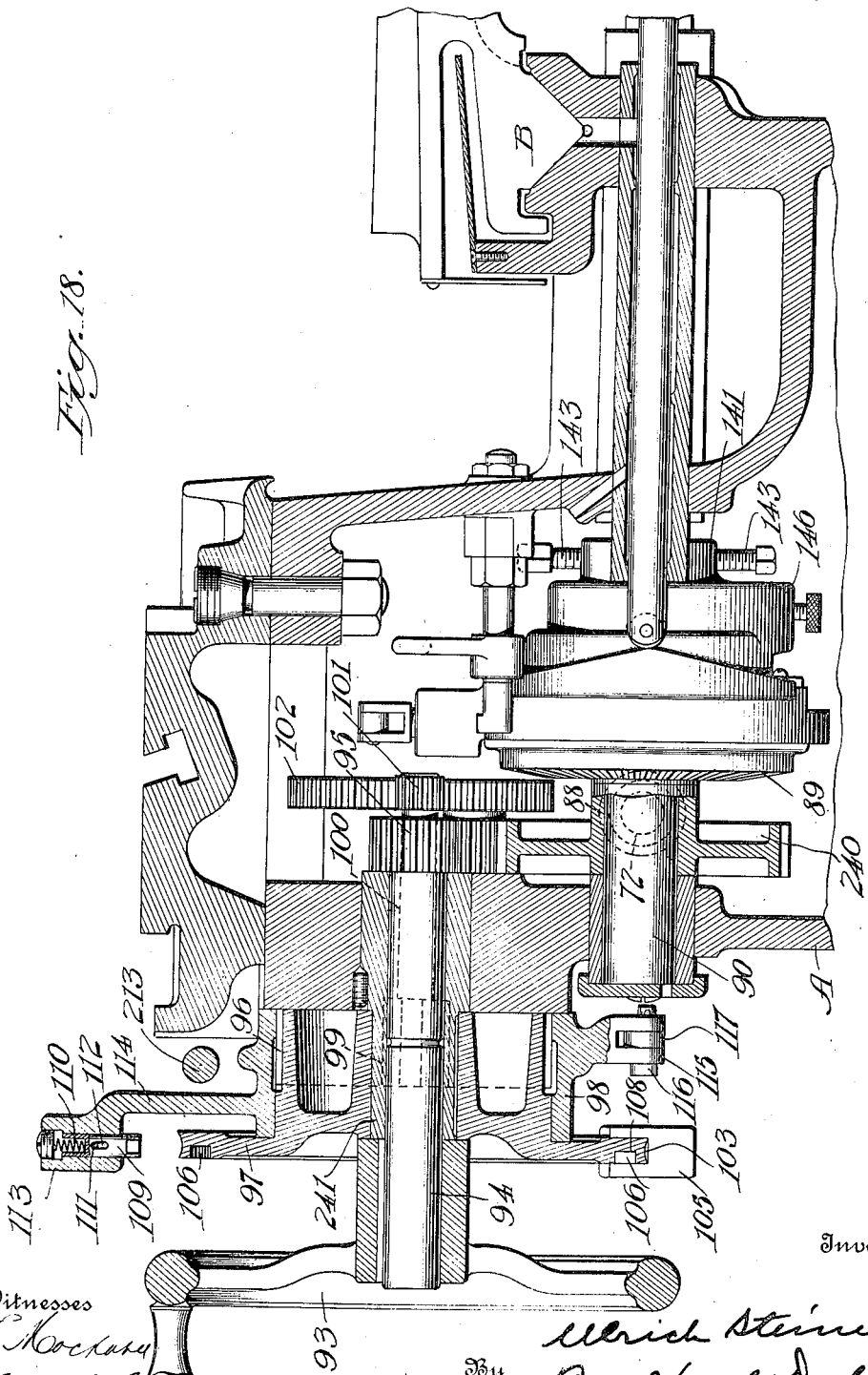

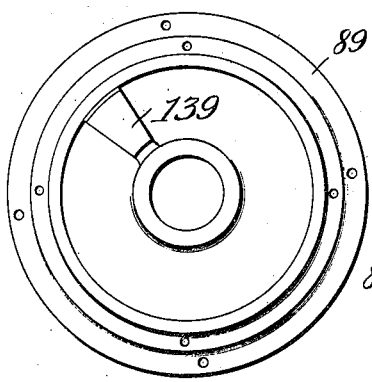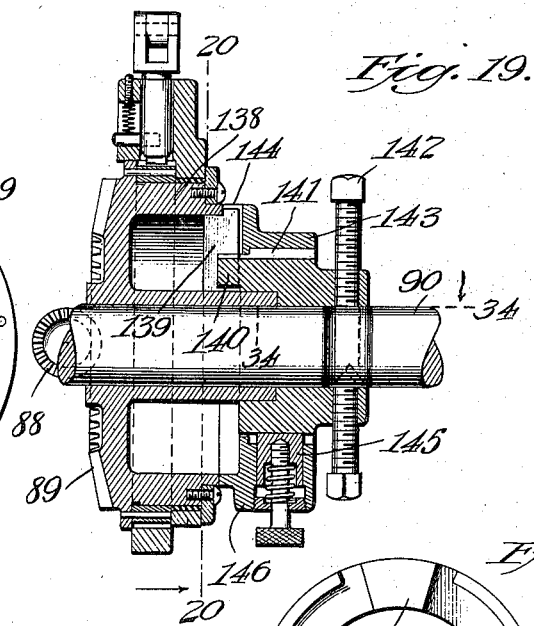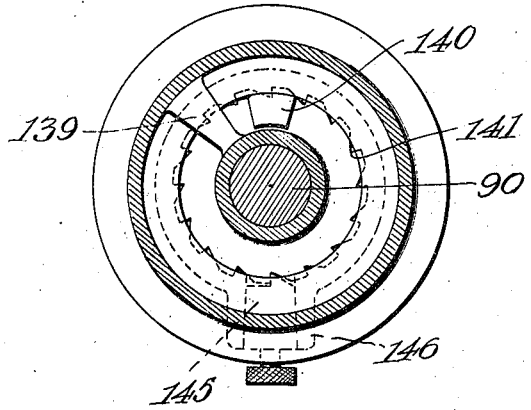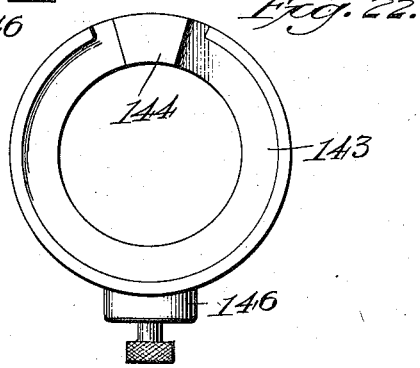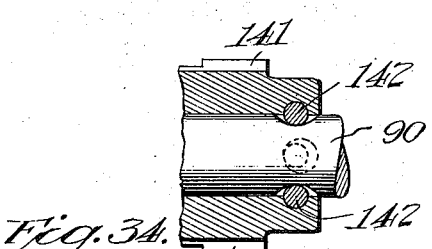

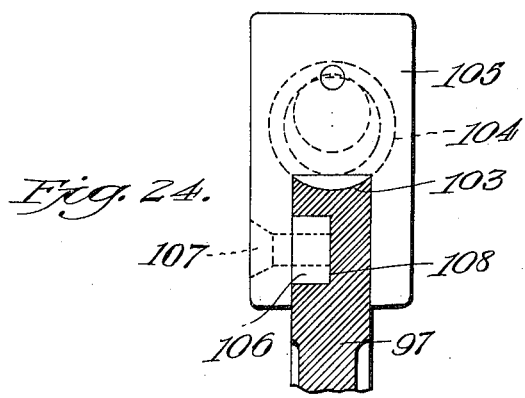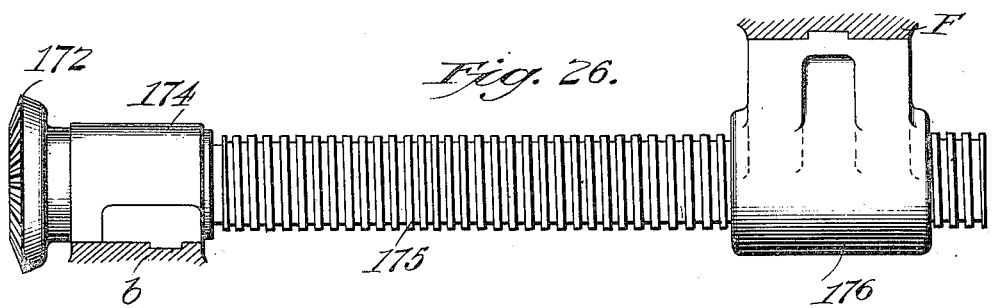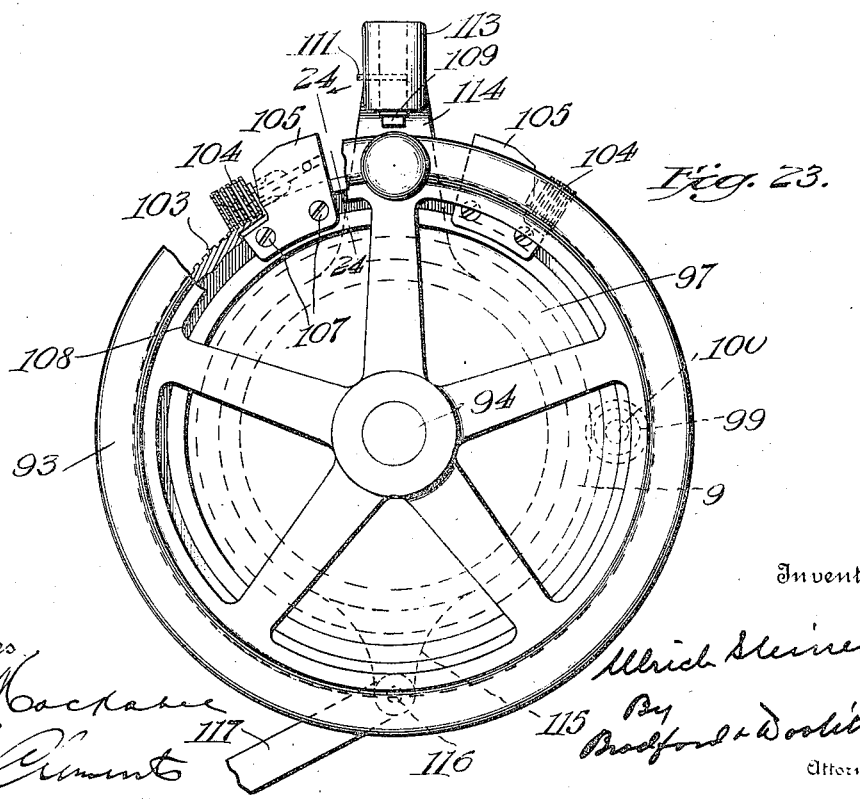

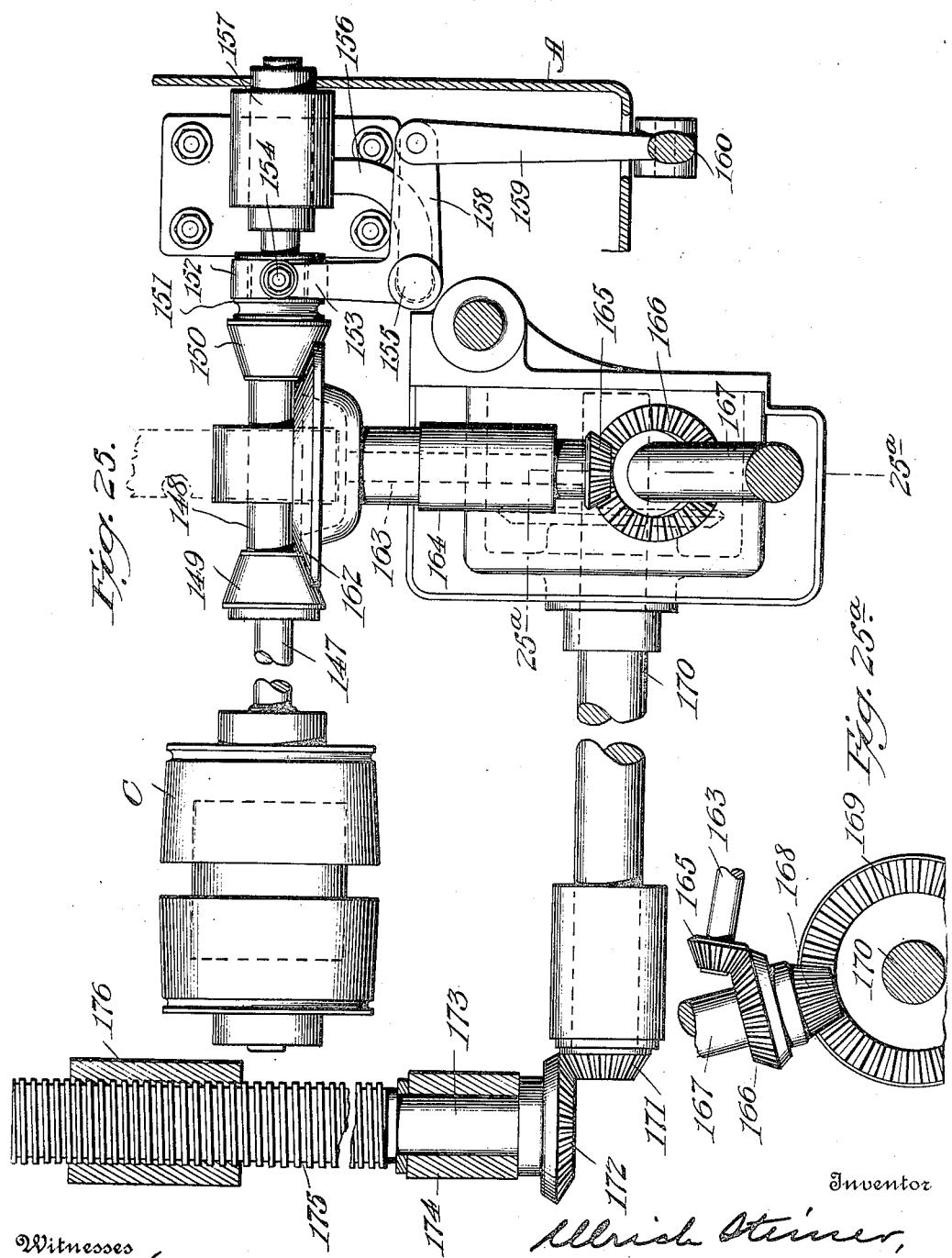

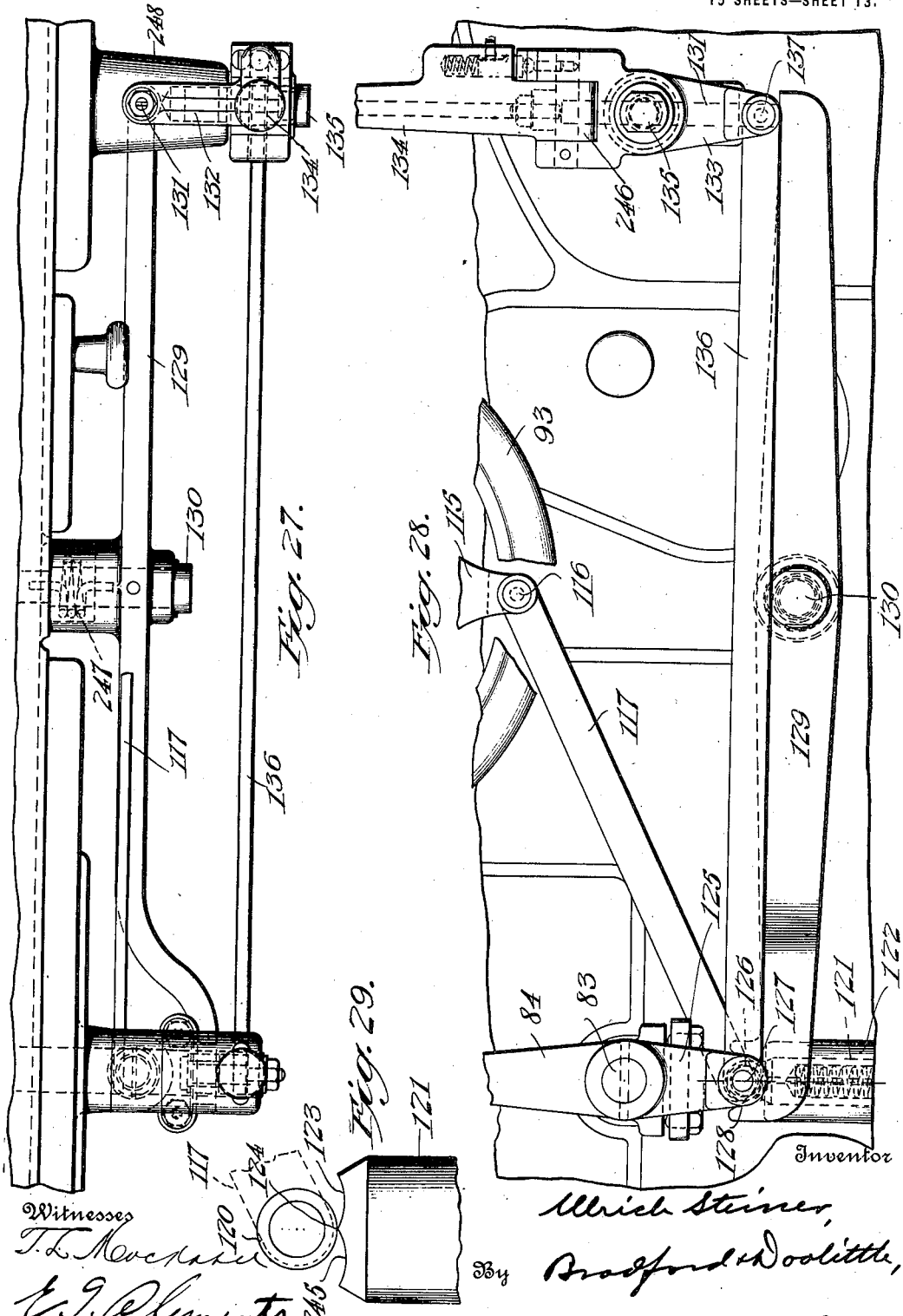

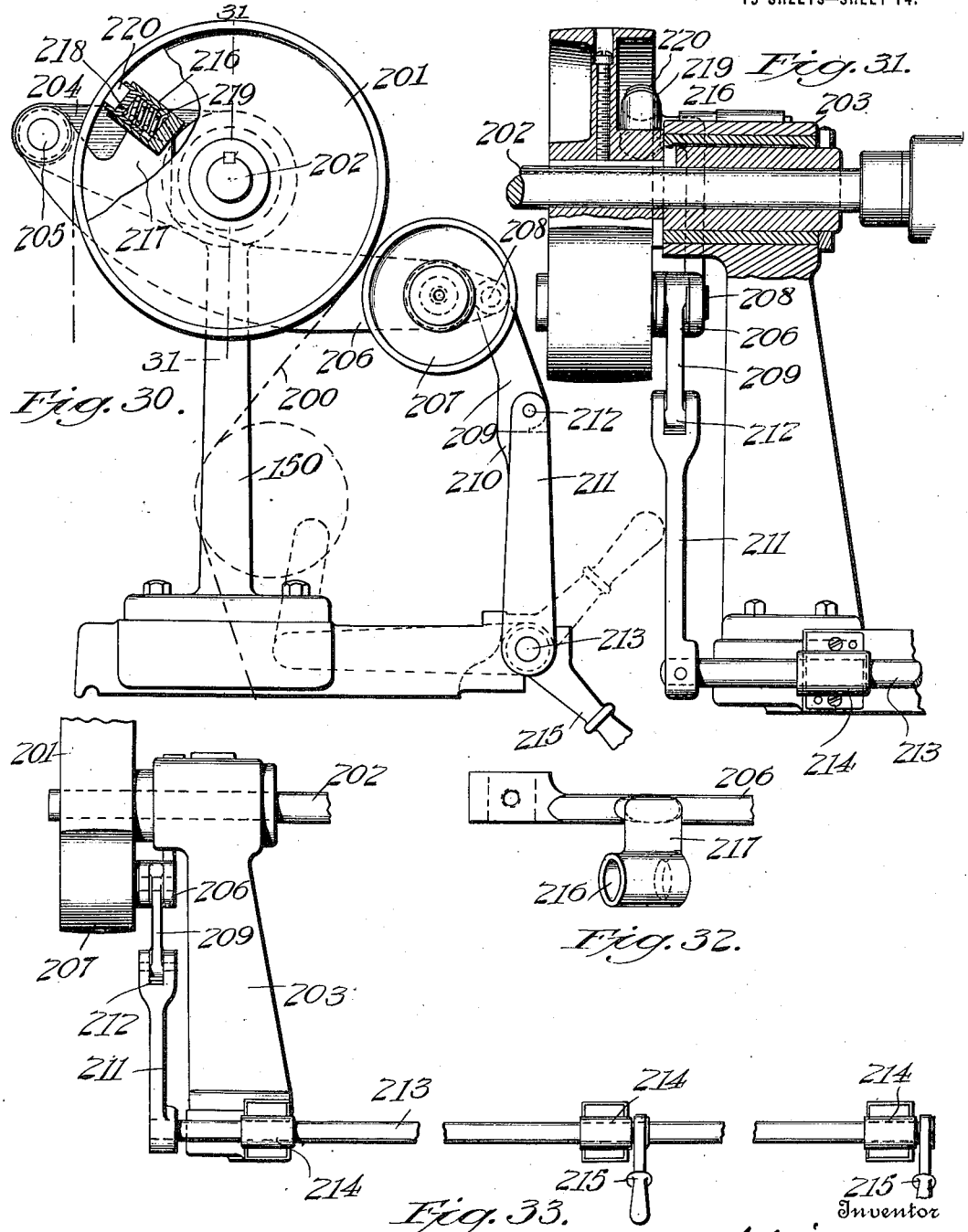

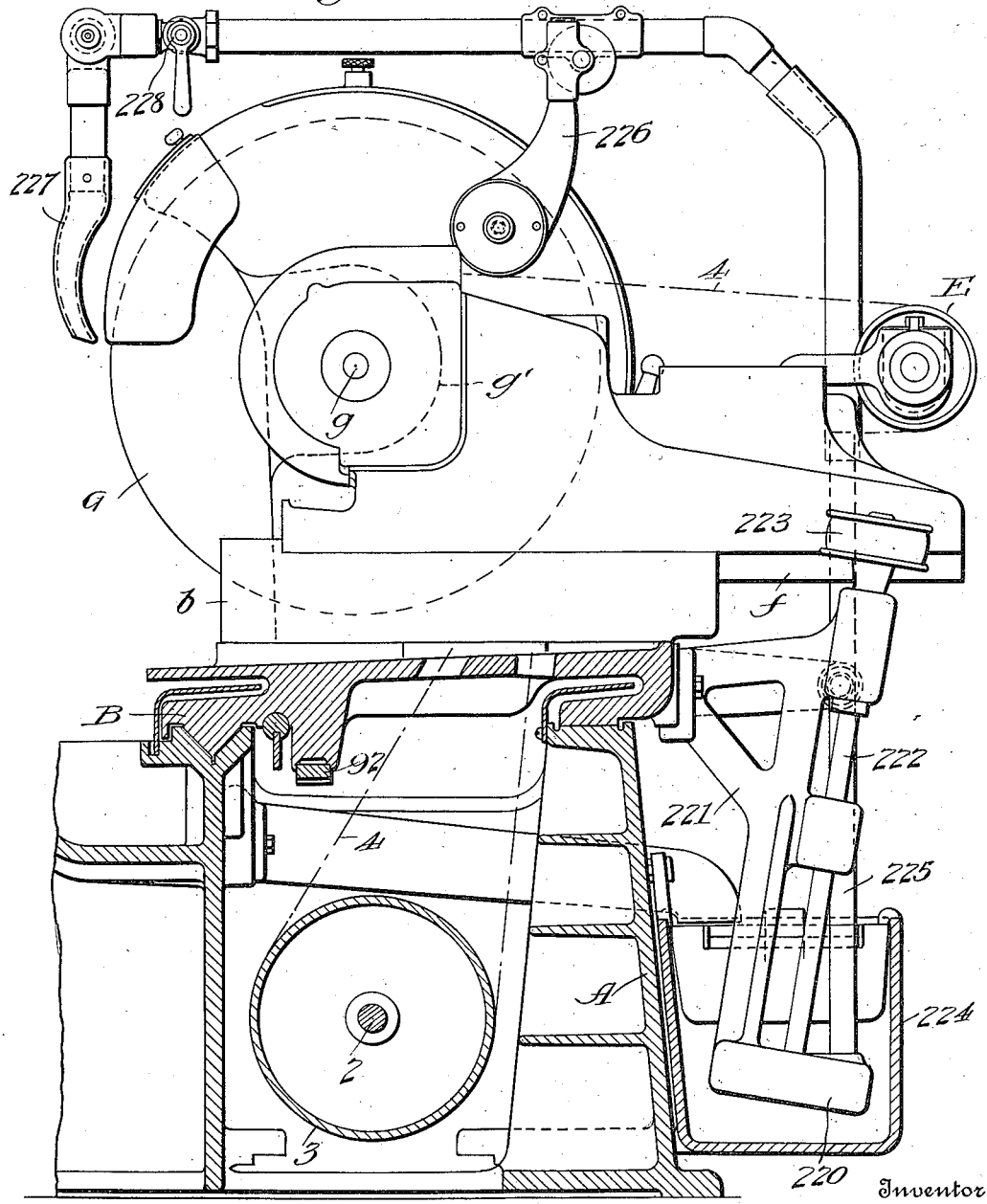

ULRICH STEINER, OF WAYNESBORO, PENNSYLVANIA, ASSIGNOR TO LANDIS TOOL COMPANY, OF WAYNESBORO, PENNSYLVANIA, A CORPORATION.

GRINDING-MACHINE.

1,156,254.  Specification of Letters Patent.  Patented Oct. 12, 1915.

Application filed July 27, 1912. Serial No. 711,935.

*To all whom it may concern:*

Be it known that I, ULRICH STEINER, a citizen of the United States, residing at Waynesboro, Franklin county, and State of Pennsylvania, have invented and discovered certain new and useful Improvements in Grinding-Machines, of which the following is a specification.

My said invention consists in various improvements in the details of construction and arrangement of parts of grinding machines, relating more particularly to grinding machines of the well known "Landis" type, shown, for example, in Patents 639,900, 640,669, and 945,464, whereby many advantages in the construction, operation and use of such machines is secured, all as will be hereinafter more fully described and claimed.

Referring to the accompanying drawings which are made a part hereof, and on which similar reference characters indicate similar parts: Figure 1 is a front elevation of my improved grinding machine. Fig. 2 is a detail view on the line 2—2 in Fig. 1, showing certain gear connections. Fig. 3, a cross section on the line 3—3 in Fig. 1. Fig. 4, a detail view of an "equalizing" ring. Fig. 5, a detail sectional view through the main clutch pulley and one end of the main shaft on the dotted line 5—5 in Fig. 2. Fig. 6, a view on the dotted line 6—6 in Fig. 5, illustrating the friction ring of the clutch pulley. Fig. 7, a longitudinal sectional view through the transverse speed change on the dotted line 7—7 in Fig. 9. Fig. 8, a detail cross section on the dotted line 8—8 in Fig. 7. Fig. 9, a cross section on the dotted line 9—9 in Fig. 7. Fig. 10, a detail view of one of the segmental gears shown in Fig. 9. Fig. 11, a similar view of the other segmental gears. Fig. 12, a detail elevation of the reversing clutch mechanism. Fig. 13, a horizontal view of the same on the dotted line 13—13 in Fig. 12. Fig. 14, a detail cross sectional view on the dotted line 14—14 in Fig. 12. Fig. 15, a similar view on the dotted line 15—15 in Fig. 12. Fig. 16, a cross section of the reversing clutch mechanism taken about on the line 16—16 in Fig. 12 and showing the operating lever and its contiguous mechanism, together with a part of the machine casing. Fig. 17, a longitudinal sectional view through the work speed change mechanism. Fig. 18, a detail transverse sectional view through a portion of the machine on the dotted line 18—18 in Fig. 1. Fig. 19, a sectional view of the "tarry" mechanism. Fig. 20, a sectional view on the dotted line 20—20 in Fig. 19. Fig. 21, a rear elevation of the bevel gear 89 shown in Fig. 19. Fig. 22, a detail view of the part 143 of the "tarry" mechanism. Fig. 23, a detail elevation of a hand traversing wheel and a part of the automatic reversing mechanism. Fig. 24, a cross section on the dotted line 24—24 in Fig. 23. Fig. 25, a horizontal sectional view through one end of the machine illustrating a portion of the mechanism for reversing the direction of travel of the grinding wheel to and from the work. Fig. 25$^a$, a detail view on the dotted line 25$^a$—25$^a$ in Fig. 25. Fig. 26, a detail view, illustrating the feed screw and its traveling nut. Fig. 27, a detail top plan view of some of the operating levers on the front of the machine. Fig. 28, a detail elevation of the same. Fig. 29, a detail view on an enlarged scale of the upper end of the spring operated plunger shown in Figs. 16 and 28. Fig. 30, a detail end elevation of the mechanism for starting and stopping the work. Fig. 31, a sectional view on the dotted line 31—31 in Fig. 30. Fig. 32, a detail view of a portion of the lever in which the brake is mounted. Fig. 33, a fragmentary elevation of this mechanism. Fig. 34, a detail view on the dotted line 34—34 in Fig. 19. Fig. 35, a detail cross section through the grinding wheel side of the machine, illustrating the traveling pump for supplying water to the work. Fig. 36, a detail view looking in the direction indicated by the arrows from the dotted line 36—36 in Fig. 28, and Fig. 37, a detail, showing the outer end of lever 129 of Fig. 28 on an enlarged scale.

In said drawings the portions marked A represent the main casing of the machine, B the grinding wheel carriage, C, D and E pulleys forming part of the main drive, F the grinding wheel base, and G the grinding wheel, all of which are of a form and arrangement in main familiar to those skilled in the art and require no special description herein.

Referring to said drawings in detail, the numeral 1 designates the main drive pulley through which power is transmitted to the machine, said pulley being mounted upon a shaft 2 journaled in suitable bearings in the main casing A. This shaft has mounted upon it within the casing a drum 3 through which power is transmitted to the grinding wheel through the medium of a belt 4, said belt passing upward through the longitudinally movable grinding wheel carriage B over pulleys D, E, $g'$ and C mounted on the transversely movable grinding wheel base F. The grinding wheel G is mounted upon a spindle $g$, said spindle being mounted in suitable bearings upon the base F and having thereon a pulley $g^1$ over which the belt 4 passes to impart motion to said grinding wheel. The pulley E may be a tensioning pulley to take up slack in the belt 4. The base F is mounted in suitable ways to traverse across carriage B in order that the grinding wheel may be moved in a direction to and from the work by means to be hereinafter more fully described.

Mounted upon the shaft 2 is a pulley 5, a belt 6 passing over this pulley and over a pulley 7 which is mounted upon one end of a shaft 8, the belt 6 thus transmitting power from said shaft 2 to said shaft 6. A suitable tensioning pulley 9 mounted upon an arm 10, which arm is in turn mounted upon the shaft 2, serves to keep the belt 6 under operative tension.

Pulley 7 is mounted loosely upon shaft 8 and is adapted to be locked to said shaft by means of a friction ring 11 keyed to said shaft by a key 12 (see Fig. 6). The friction ring 11 is split on one side and formed with inclined adjacent faces 13 between which a wedge-shaped head 14 of a slide 15 is adapted to operate. This slide is mounted in a groove 16 formed in an interior portion or hub 17 of the friction ring 11, this hub portion 17 being formed with an opening through which shaft 8 passes. A longitudinal groove 18 is formed in shaft 8 and a slide bar 19 is mounted therein (Fig. 5). The outer end of said slide bar is formed with an inclined outer surface 20 adapted to operate beneath a radial sliding block 21, the inner end of which rests upon the incline 20 of the bar 19. A collar 22 is loosely mounted upon the shaft 8 and is connected to the bar 19 by means of a screw 23. A stop ring 24 secured to the shaft 8 limits the movement of this collar in one direction, while the bearing 25, formed upon the machine casing A, and through which shaft 8 passes, serves to limit its movement in the opposite direction. A yoke 26 works within a groove 28 in collar 22 and is formed on a base 27 keyed to a short shaft 29 which is journaled in bearings in the machine casing A and provided with an operating lever 30 (Fig. 1) located upon the outside of the casing. As will be seen, a movement of lever 30 in the direction of the arrow shown in Fig. 1 of the drawings will, through the medium of the yoke 26 in the collar 22, cause the bar 19 to move to slide block 21 outward and drive the wedge 14 between the inclined surfaces 13 of the ring 11, expanding said ring and causing it to grip the inner surface of the housing 31 formed in the web of the pulley 7 and lock said pulley to the shaft 8. A suitable cover 32 is secured upon the outer face of the web of pulley 7 so that said housing 31 is closed and the operating mechanism entirely housed within said inclosure.

The shaft 8 extends practically the entire length of the machine and adjacent to the collar 22 extends through suitable bearings 33 formed upon a bracket or "gear frame" $a$ secured to the machine casing. Loosely mounted on shaft 8 is a friction disk 34, being one of a pair of concaved friction disks which constitute a portion of the mechanism for controlling the speed of the travel of the grinding wheel carriage B longitudinally of the machine. A disk 35 similar to the disk 34 is provided with a bushing 36 and loosely mounted on said shaft 8. Said disks 34 and 35 are arranged with their concave faces adjacent and a pair of friction wheels 37 of like construction are interposed between them. Said wheels 37 are provided with a peripheral groove in which a friction contact ring 38 is mounted. Said wheels are mounted upon axles 39 secured in yokes 40, said yokes being mounted upon pivot pins 41 secured in the upper end of studs 42 mounted in suitable bearings 43 in the gear frame $a$. The pivotal movement of the yoke upon the pins 41 permits the wheels 37 to remain centered between the disks 34 and 35 at all times so as to secure an equal bearing of all of the friction surfaces. Segmental gears 44 and 45 are rigidly secured to the studs 42 below the yokes 40, the said gears 44 and 45 being in mesh, so that a movement of either one of the studs 42 will cause a corresponding movement of the other stud and shift the angle of wheels 37 and their contact points in relation to the axis of the concaved friction disks 34 and 35. The segmental gear 45 is a double gear, its opposite segment 46 being formed with beveled teeth 47 which engage correspondingly beveled teeth 48 upon a vertically disposed segment 49 mounted upon a short shaft 50 journaled in a bearing in the "gear frame" plate $a^1$ forming part of casing A and covering an opening in the side of machine casing A (see Fig. 9). This shaft 50 has secured upon its outer end an operating lever 51 provided with an operating handle 52. A spring latch 53 is mounted on said lever adjacent to said handle. This latch is operated by a hand grip 54 and is adapted to engage with any one of a series of holes or sockets 55 formed in a segment 56 on the upper edge of the plate $a^1$.

By moving the lever 51 the studs 42 are caused to rotate in their bearings through the medium of the segmental gears just described, which movement causes the bearing faces of wheels 37 to move along the concave faces of the disks 34 and 35. As will be readily understood, this operation will cause the disk 35 to be driven at a greater or less speed, according to the angle at which the wheels 37 are positioned. In order that the disks 34 and 35 may have sufficient bearing against the wheels 37, springs 57 are housed within a sleeve 58 secured upon the shaft 8 by means of a pin 59 and bear against the outer face of disk 34 and tend to force said disk against the interposed wheels 37, which wheels in turn bear upon the disk 35. An equalizing ring 60 (Figs. 4 and 7) is pivotally secured at 61 to the collar 58, and a pair of rollers 62 which bear against a double cam face 63 formed upon the outer face of disk 34. Said equalizing ring serves to transmit motion to disk 34 and maintain a pressure upon the disk 34 corresponding to the load and take up automatically any wear occasioned by the operation of these parts. This is done by the rollers 62 being forced upon the higher portions of the cams as the wear takes place.

As before stated, the disk 35 is mounted upon shaft 8, and upon the hub of this disk is mounted a pinion 64. This pinion meshes with a spur gear 65 mounted upon a short shaft 66, the said shaft operating in a bearing 67 formed upon the bracket $a$. The shaft 66 is further supported in other bearings 68 (Fig. 12) carried by brackets 69 on the "gear frame" plate $a^1$ and has a pinion 70 secured thereon, said pinion meshing with a spur gear 71 mounted upon a shaft 72, which shaft is mounted in bearings 73 also formed on the brackets 69. Another gear 74 similar to the gear 71 is mounted upon the shaft 72, both of the gears 71 and 74 being formed with hubs 75 which are provided with clutch teeth 76 and 77, respectively, these teeth being adapted for engagement with the teeth 78 of a sliding sleeve 79 slidably mounted upon the shaft 72 between said gears 71 and 74. This sleeve 79 is mounted on shaft 72 to turn therewith and engaged by a yoke 80 carrying rollers 81 adapted to operate within a groove 82 formed in said sleeve. The yoke 80 is mounted upon one end of a short shaft 83 and is operated by means of a hand lever 84 (Fig. 16) upon the outside of the machine casing A. The shaft 66 carries another pinion 85 which meshes with one face 86 of a long pinion on a shaft S, also journaled in bearings on the brackets 69. The other face, 87, of said long pinion meshes with the gear 74 and imparts motion thereto. Both of the gears 71 and 74 are loosely mounted upon the shaft 72 and when the clutch is in the position shown in Fig. 12 of the drawings said shaft is at rest and is only driven when the teeth 78 of the sleeve 79 engage the teeth 76 to drive the carriage in one direction, or the teeth 77 to reverse it.

Located upon the end of the shaft 72 is a beveled pinion 88, this pinion being shown in dotted lines in Figs. 3 and 18 of the drawings and in full lines in Figs. 12 and 19. A beveled gear 89 secured upon a shaft 90 mounted within bearings in the machine casing meshes with and is driven by the pinion 88. The opposite end of the shaft 90 (Fig. 3) is provided with a pinion 91 which engages a rack 92 secured to the under side of the carriage B, so that rotation of the shaft 90 will traverse said carriage. The reversing of this shaft 90 is accomplished through the clutch members 75 and 79 shown in Fig. 12 of the drawing, and may be either manually, through lever 84, or automatically controlled, as will be later explained. Said carriage B may be traversed manually by means of a hand wheel 93 mounted upon the outer end of a shaft 94 journaled in suitable bearing in casing A, said shaft 94 being geared to the shaft 90 through a train of gears 95 and 240 shown in Fig. 18 of the drawings.

In order to automatically reverse the traverse of the grinding wheel at the end of the work, mechanism is provided as follows: A gear 96 with a wheel 97 on its outer end is loosely mounted on bushing 241 on shaft 94. A sleeve 98 surrounds the gear 96, which gear meshes with a pinion 99 mounted upon a shaft 100 journaled adjacent to shaft 94, said shaft 100 having upon its opposite end a gear 102 meshing with a pinion 101 on said shaft 94. It is thus apparent that motion will be imparted to the shaft 100 and transmitted to the gear 96 through the pinion 99 which will cause the rotation of the disk 97. Said disk 97 is formed around its periphery with teeth 103 (Fig. 23), said teeth engaging worms 104 carried on spring arms by dogs 105 and adapted to be adjusted any desired distance apart upon the periphery of said disk 97. These dogs 105 are held in position upon the said disk by means of blocks 106 (Fig. 24) secured to said dogs by screws 107, and mounted to slide in a circular groove 108 formed in the face of the disk 97. These dogs 105 are adapted to contact with a sliding trip bar 109, said bar being controlled by a spring 110 and limited in its movement by a pin 111 working in a slot 112 formed in the bar 109. Said pin may also be used to manually lift said bar out of the path of said dogs when desired. This bar 100 is mounted in a tubular extension 113 formed upon the outer end of a radial arm 114 on sleeve 98. Through the train of gearing before described it will be seen that as the wheel 97 is turned as the grinding wheel carriage travels one or the other of the dogs 105, according to the direction of the travel, will contact trip bar 109 at a predetermined point in the travel, the dogs being set on periphery of wheel 97 to time the contact as desired. By lifting the worms 104 out of engagement with threads 103 said dogs can be quickly slid to the approximate position desired and the exact position secured by an accurate adjustment by turning said worms on their spring spindles. This feature is common in the Landis machine, however, and needs no further description.

When the contact takes place sleeve 98 is rocked and the reversing mechanism operated as follows: Diametrically opposite the arm 114 on the sleeve 98 is a second radial arm 115, the latter arm having pivotally secured thereto at 116 one end of a rod 117. The opposite end of the rod 117 is secured to a bifurcated arm 118 mounted upon the shaft 83 of the reversing clutch previously described by a pin 119 which also carries a roller 120 adapted to operate over the outer end of a spring-pressed plunger 121 housed within an extension 122 of the casing A (see Figs. 16, 28 and 29). The upper end of the plunger 121 is formed with two concaved surfaces 123 and 245, the meeting point of these two surfaces forming a ridge 124 over which the roller 120 is adapted to ride. As soon as the roller passes over said ridge the spring will quickly position the parts and support them in one engagement or the other. When the roller 120 rests within the concaved surface 245 the teeth 78 of the sleeve 79 of the reversing clutch engage the teeth 76 on the hub 75 of the gear 71, causing the said gear to be locked to the shaft 72 and drive the shaft 90, and consequently the carriage B in one direction. When the roller 120 rests within the other concaved surface 123 the teeth 77 formed on the hub 75 of the gear 74 are engaged and a reverse movement of the carriage B takes place. This action of the shifting of the roller 120 from the concaved surface 123 to 245 is due to the contact of either of the dogs 105 with the bar 109 rocking sleeve 98 and causing the movement of the rod 117 and the shifting of said roller 120 from one concave surface to the other. When the roller 120 occupies the position directly over the ridge 124 of the plunger 121, as shown in Fig. 29, the reversing clutch is out of mesh in the position shown in Fig. 12 of the drawings.

The lever 84 upon the shaft 83 has a depending arm 125 formed upon its hub, carrying a roller 126 mounted eccentrically upon a stud 127. This eccentrically mounted roller 126 is adapted to be acted upon by a V-shaped notch 128 in the top edge at the outer end of a lever 129 pivoted upon the front of the machine casing at 130. The opposite end of this lever is adapted to be depressed by a rod 131 (Figs. 27, 28 and 36) mounted to slide in a boss 248 on the machine casing and contacting at its upper end with a horizontal extension 132 on the lower end of a hand lever 134 and at its lower end resting on said lever 129. Said lever 134 is formed in two parts connected by a pivot 246 and held normally in line by a spring latch 250 on part 134 with a pointed lower end adapted to ride over and bear on one side or the other of a ridge 251 on a plate secured to the top of lower part 133. Said lever is adapted to swing on pivot 135 in a direction longitudinally of the machine and also inward on pivot 246. This latter movement depresses adjacent end of the lever 129 and raises the opposite end and causes one side or the other of V-shaped notch 128 of this lever to bear against roller 126 and guide said roller to the bottom of said notch which will center clutch part 79 and stop the travel of the carriage B. In order that motion may again be given the carriage B, the lever 134 is moved outward and swung upon its pivot 135 which, through a connecting rod 136 pivoted at one end at 137 to the lower end of lever 134 and at its other end to arm 125 of lever 84, serves to operate shaft 83, which operation moves the clutch member 79 into engagement with either of the clutch teeth 76 or 77 and imparts motion to the carriage B in a direction determined by the movement given the lever 134. A coiled spring 247 is mounted in the hollow hub of lever 129 around its pivot 130, one end being inserted in said hub and the other end in an adjacent part of the casing A, the tension of said spring being directed to normally hold the outer end of said arm upward, as indicated by whole lines in Fig. 37, with roller 126 in the bottom of its bifurcation and lever 84 vertical with clutch part 79 out of mesh with either of the cooperating clutch faces. As indicated in said figure, the tapered side of the bifurcation is of an angle to operate on said roller to swing lever 84 to unclutch the mechanism when lever 129 is operated and spring 247 will hold said parts against accidental engagement until forcibly operated by the means before described.

It is very often desirable to have the carriage B pause or "tarry" at each end of its stroke before the reverse movement begins. To accomplish this I have provided a "tarry" mechanism shown in Figs. 3, 18, 19, 20, 21, and 22 of the drawings. Upon the rear portion 138 of the beveled gear 89 is formed a radial lug 139 which is adapted to be engaged by a lug 140 formed upon a circular ratchet 141 which is secured to the shaft 90 by means of screws 142 (see Figs. 19 and 34). This ratchet 141 is provided with a cover or housing 143 which has a lug 144 formed thereon for engagement with the lug 139 upon the beveled gear 89. This latter lug lies between the lugs 140 and 144 and when moved in either direction will engage one of these lugs. The cover or housing 143 is secured to the ratchet 141 by means of a spring-pressed detent 145 slidable in an extension 146 of said housing, so that the lug 144 may be set at any desired distance from the lug 140, in order that the play of the lug 139 may be increased or decreased, as desired. The amount of travel of the lug 139 between the lugs 140 and 144 determines the pause or "tarry" of the carriage B at either end of its stroke, as the beveled gear 89 will turn loosely upon the shaft 90 until the lug 139 engages either the lug 140 or the lug 144, which will then reverse the motion of shaft 90 and carriage B. This pause or "tarry" of the shaft 90 permits the feed of the grinding wheel to the work while the carriage B is at rest, to start the return cut or finish the ends or corners of the work, as may be desired.

In order that the grinding wheel may be moved in a direction to and from the work, the slider F is mounted on ways $f$ formed upon the under side of the said slider and the portion $b$ of the carriage B. Motion is imparted to the base F by means of the pulley C over which the belt 4 passes, the said pulley being mounted upon a shaft 147. A sleeve 148 is slidably mounted upon this shaft, the said sleeve carrying two friction cones 149 and 150. The friction cone 150 has formed upon its hub a groove 151 with which a collar 152 is adapted to engage. A yoke 153 secured to the collar 152 by bolts 154 is pivotally mounted at 155 upon an arm 156 of a bearing 157 of the shaft 147. The yoke 153 is formed with a right angled arm 158 to which is pivoted a lever 159, the said lever extending through the casing A and being pivoted to an operating lever 160 within convenient reach. A friction disk 162 secured upon one end of a shaft 163, said shaft being mounted in a bearing 164, is adapted for contact with either of the friction cones 149 or 150 when the lever 160 is operated, the direction of rotation of the shaft 163 being determined by the contact with either of these cones, as will be readily seen by reference to Fig. 25. The opposite end of the shaft 163 has a beveled pinion 165 mounted thereon for engagement with a beveled pinion 166 mounted upon a shaft 167, the said shaft carrying upon its upper end mechanism forming the subject-matter of another application. Another beveled pinion 168 is mounted on shaft 167 below pinion 166 and meshes with a beveled gear 169 mounted upon a shaft 170, motion being imparted to this shaft through the gears just described. A beveled pinion 171 on the shaft 170 is adapted to mesh with and drive another beveled pinion 172 mounted upon a shaft 173 in a bearing 174 on the carriage B. The shaft 173 is formed with threads 175 practically throughout its length and operates within a nut 176 secured to the under side of the base F so that the rotation of the said shaft 173, through the gears just described, will cause the nut 176 to travel along the threaded portion 175 and impart motion to the base F in a direction determined by the operation of the lever 160.

The mechanism for varying the speed at which the work may be driven is mounted upon the shaft 8 adjacent to the reversing clutch mechanism, and comprises practically a duplication of the mechanism for varying the speed of the travel of the grinding wheel longitudinally of the machine, as shown chiefly in Fig. 17. This mechanism comprises a concave friction disk 177 mounted upon the end of the shaft 8, the said shaft terminating at this point, and being mounted in a bearing 179 formed upon a bracket 180 forming a part of or secured to the machine casing A. Another concave friction disk 181 is secured to a short shaft $8^a$, which shaft is in line with said shaft 8 and mounted in a bearing 182 upon the opposite side of the bracket 180. Interposed between these two friction disks 177 and 181 are a pair of wheels 183 mounted upon yokes 184 and pivoted at 185 to the upper end 186 of a stud 187, said stud having a bearing 188 in the bracket 180. The wheels 183 are formed with a peripheral friction ring 189, the said wheels and disks just described being, as before stated, similar to the mechanism previously described for varying the speed of the travel of the grinding wheel longitudinally of the machine.

An equalizing ring 190 mounted upon a sleeve 181, and carrying rollers 192, is adapted to operate upon the cam face 193 formed upon the disk 177 in a manner similar to the ring 34 previously described. Springs 194 are also housed within the sleeve 191 and bear against the disk 177. The wheels 183 are movable upon the stud 187 through segmental gears similar to the gears 44, 45, 47, and 48 shown in Figs. 9, 10, and 11 of the drawings, only one gear, 195, being shown in connection with the mechanism for varying the speed at which the work may be driven (see Fig. 17). This mechanism is controlled by a hand lever 196 shown in Fig. 1 of the drawing, the said lever being adjusted in position by means of a pawl engaging with openings or sockets 197 illustrated in said figure. The outer end of the shaft $8^a$ passes through a bearing 198 on the casing A and has mounted thereon a pulley 199 over which a belt 200 is adapted to pass in order to drive a pulley 201 which operates the head-stock H. The pulley 201 is mounted upon a shaft 202 within a bearing 203 secured to the top of the machine casing, said bearing having an arm 204 projecting therefrom. This arm has pivoted thereto, as at 205, a lever 206, the opposite end of this lever carrying a pulley 207 adapted to be brought into contact with the belt 200 to tighten said belt sufficiently to cause the pulley 201 to rotate. The outer end of the lever 206 has pivoted thereto at 208 one of a pair of levers 209, the said lever having a shoulder 210 against which the other lever 211 is adapted to abut, the levers 209 and 211 being pivoted at 212. The lower end of the lever 211 is secured to a shaft 213, the said shaft being mounted in bearings 214 secured to the front of the work table, and having hand levers 215 located at convenient points for manipulation. When the pulley 207 is in the position shown in full lines in Fig. 30, the belt 200 is loose, and allows the pulley 199 on the shaft 8ᵃ to run idly therein, but when it is desired to operate the pulley 201 and shaft 202 and turn the work secured in the head-stock H, the hand levers 215 are thrown upward in the position shown in dotted lines in said Fig. 30 which throws the pulley 207 against the belt 200, tightening said belt and imparting motion to the pulley 201. When it is desired to stop the work without stopping the mechanism of the machine, the lever 215 is thrown downward to the position shown in full lines in Fig. 30 which loosens the belt and releases the drive. In order that the work may be stopped at once upon such operation of lever 215, a brake is provided to operate upon the inner side of the rim of the wheel 201. This brake consists of a cylinder 216 formed upon an extension 217 of the lever 206, and within this cylinder is a spring operated plunger 218, the spring 219 tending to force the said plunger outwardly in contact with the inner side of the rim of the pulley 201. The plunger 218 has secured at its contacting end a felt or other suitable tip 220, the said tip acting to "break" the pulley 201 when brought into contact therewith, as when the parts are brought to the position shown by whole lines in Fig. 30.

In Fig. 35 I have illustrated my improved means for supplying water to the work at the point of grinding consisting of a rotary pump 220 carried by a bracket or frame 221 rigidly bolted to the rear edge of the grinding wheel carriage B. Said pump is provided with a driving shaft 222 on which is a pulley 223 on which the driving belt is mounted (not shown). Said pump hangs from said grinding wheel carriage and is adapted to travel in a water supply tank 224 extending the length of the machine. An ejector pipe 225 leads from the pump casing over suitable supports 226 and is provided with a discharge nozzle 227 arranged to direct the discharge onto the work at the point of the operation of the grinding wheel. A valve 228 is provided by which the flow of water may be controlled.

By these various improvements, as will be readily seen, the machine is adapted for more efficient and convenient operation in many particulars than the old construction, various advantages having been pointed out in the description of the various parts and others being apparent. Among these improvements will be noted the single driving shaft operating the work drive and carriage drive, each of which includes independently operating change speed gearing; the means for releasing and operating the reversing clutch by a single lever; the "tarry" mechanism in the carriage operating mechanism, the rapid power feed for the wheel base, and various improvements in the general construction and arrangement of mechanisms, as before pointed out.

Having thus fully described my said invention, what I claim as new and desire to secure by Letters Patent is:

1. A grinding machine embodying work supporting mechanism and grinding mechanism, said grinding mechanism mounted upon a traversing carriage, means for traversing said carriage comprising a driving shaft, gearing connecting said driving shaft with the power shaft embodying a reversing mechanism, said reversing mechanism, means for shifting said reversing mechanism both automatically and manually, and means for locking said reversing mechanism with the driving mechanism out of gear, substantially as set forth.

2. A grinding machine comprising work supporting and driving mechanism, a grinding wheel carriage, mechanism for traversing said carriage, means for varying the speed of said carriage drive, means for varying the speed of said work drive, and a main driving shaft geared to operate both the carriage drive and the work drive, substantially as set forth.

3. A grinding machine comprising work supporting and driving mechanism, means for varying the speed of the work drive, a grinding wheel carriage, mechanism for traversing said grinding wheel carriage, means for varying the speed of the grinding wheel carriage, and a single driving shaft geared to operate both sets of mechanism, substantially as set forth.

4. A grinding machine comprising a frame, a grinding wheel carriage, means for traversing said grinding wheel carriage, change speed gear interposed between the driving shaft and the carriage operating the shaft, said change speed gear comprising a pair of opposed concave friction disks loosely mounted on a shaft and connected by interposed disks mounted on a swiveled frame, one of said concave disks being formed with tapered faces on its exterior surface, an equalizing ring pivotally mounted on a hub and formed with cam faces adapted to operate upon the tapered faces of said disks, said hub keyed to the shaft, and means for turning said swiveled frame for varying the speed, substantially as set forth.

5. A grinding machine comprising work supporting and driving mechanism, a grinding wheel carriage, mechanism for traversing said carriage, said mechanism including a change speed gearing comprising a pair of opposed concave disks operatively connected by a pair of interposed friction disks mounted on a swiveled frame, means for swiveling said frame and securing it in position, and an equalizing ring mounted on a hub and engaging the outer surface of the adjacent disks by tapered faces, and said hub keyed to the driving shaft, substantially as set forth.

6. A grinding machine comprising a grinding wheel carriage, traversing mechanism therefor, said traversing mechanism including a change speed gear comprising a pair of concave disks mounted loosely on the driving shaft and operatively connected to each other by interposed friction disks, a ring pivoted to a hub, said hub keyed to said driving shaft, and springs interposed between said hub and the outer surface of the adjacent disks, said ring and said adjacent disks being formed with interengaging tapered faces, substantially as set forth.

7. A grinding machine comprising a work supporting and driving mechanism, a grinding wheel carriage, mechanism for traversing said carriage, a change speed mechanism interposed in the grinding wheel traversing mechanism, another change speed mechanism interposed in the work driving mechanism, means for adjusting each of said change speed mechanisms independently of the other, and a single driving shaft geared to drive both sets of mechanisms, substantially as set forth.

8. A grinding machine comprising work supporting and driving mechanism, a grinding wheel carriage, mechanism for traversing said carriage, means for reversing the traverse of said carriage at a predetermined point embodying a shifting clutch, a controlling lever for said clutch, a connection running from said controlling lever to an operating lever, pivoted holding lever for engaging with a part on the clutch controlling lever to hold said clutch in a central position, said operating lever being formed to swing both toward and from the machine and in line with the machine and connected to throw said holding lever out of engagement by one motion and operate the controlling lever with the other motion, substantially as set forth.

9. A traversing mechanism for the grinding wheel carriage of a grinding machine comprising a reversing clutch, a controlling lever for said clutch, means for holding said controlling lever with the clutch out of engagement, an operating lever, a connecting rod running from said operating lever to said controlling lever, said operating lever being formed with a hinged joint and a horizontal arm, a plunger in contact with the lever for holding the clutch centered at one end and with the horizontal arm of said operating lever at its other end whereby by swinging said lever on its hinge said clutch is released and by swinging it on its main pivot said clutch is operated, substantially as set forth.

10. A grinding machine comprising a grinding wheel carriage, mechanism for traversing said carriage embodying a reversing clutch, a rock shaft connected to operate said reversing clutch, a controlling lever on the front of the machine formed with a V-shaped notch in its upper edge adapted to engage a part on said lever to normally hold it in a centered position, an operating lever, a connecting rod running from said operating lever to said controlling lever, the upper end of said operating lever being connected to its lower end by a hinged joint and formed with a horizontal arm connected to operate said holding lever to release said clutch, whereby said clutch is held from accidental engagement and also is adapted to be released and operated by a single lever, substantially as set forth.

11. A grinding machine comprising work supporting and driving mechanism, a grinding wheel carriage, mechanism for traversing said grinding wheel carriage which embodies a reversing clutch, a rock shaft connected to operate said reversing clutch, a controlling lever on said rock shaft, a connecting rod running from said controlling lever to the automatic operating mechanism, another connecting rod connecting said lever with a hand operated lever, a pivoted part for holding said controlling lever with the clutch in centered position, and said operating lever formed to have a double movement and connected to release said holding part by one movement and operate said clutch by the other movement, substantially as set forth.

12. A grinding machine comprising a work holding and driving mechanism, a grinding wheel carriage, mechainsm for traversing said carriage, said mechanism including a "tarry" mechanism mounted on the carriage operating shaft, which "tarry" operating mechanism comprises a part keyed to said operating shaft and having projecting lugs, a gear wheel loosely mounted on said shaft adjacent to said part and carrying an inter-engaging lug, and means for adjusting the relative position of said inter-engaging parts, substantially as set forth.

13. A traversing mechanism for a grinding wheel carriage of grinding machines comprising an operating shaft, a clutch part rigidly secured to said operating shaft, a gear wheel loosely mounted on said operating shaft carrying the other clutch part, a driving shaft geared to said gear wheel, and means for adjusting the connecting clutch faces in relation to each other, substantially as set forth.

14. A grinding wheel carriage traversing mechanism comprising a carriage operating shaft, gearing connecting said carriage operating shaft with the driving shaft, said gearing embodying two co-acting parts positioned to have a limited independent movement one from the other, and means for regulating the length of said independent movement, substantially as set forth.

15. A traversing mechanism for a grinding wheel carriage comprising a gear interposed between said carriage and the power composed of two parts, one connected to the other part to have a limited independent movement therefrom, and means for varying the length of said independent movement, substantially as set forth.

16. A grinding wheel traversing mechanism for grinding machines comprising a two-part gear, one part adapted to rotate for a limited distance independent of the other part, and interlocking lugs for connecting said parts, one of which lugs is adjustable whereby the length of said independent movement may be varied, substantially as set forth.

17. A grinding wheel traversing mechanism comprising a carriage operating shaft, a collar rigidly secured on said shaft, a gear loosely mounted on said shaft, a housing connected with said gear surrounding said collar, interlocking lugs connecting said collar and gear, and means for adjusting the relative position of said interlocking lugs, substantially as set forth.

18. A grinding machine comprising work holding and driving mechanism, a grinding wheel carriage, traversing mechanism for said carriage, means for reversing said traversing mechanism, means for traversing said carriage at each reverse, and means for varying the speed of said carriage, substantially as set forth.

19. A grinding machine comprising a work supporting and driving mechanism, a grinding wheel carriage, a traversing mechanism for said grinding wheel carriage, a grinding wheel base mounted to slide across said grinding wheel carriage, a rapid feed mechanism for said grinding wheel base connected to the carriage operating mechanism, and a single driving shaft connected to operate said several sets of mechanisms, substantially as set forth.

20. A grinding machine comprising a work holding and driving mechanism, means for varying the speed of said mechanism, a grinding wheel carriage mechanism for traversing said carriage, means for varying the speed of said carriage, a grinding wheel base mounted to slide across said carriage, power feed mechanism for said base, and a single driving shaft connected to operate said several sets of mechanisms, substantially as set forth.

In witness whereof, I have hereunto set my hand and seal at Washington, District of Columbia, this 23rd day of July, A. D. nineteen hundred and twelve.

ULRICH STEINER. [L. S.]

Witnesses:
E. W. BRADFORD,
E. G. CLEMENTS.